Oct. 2, 1923.
J. K. BAILEY
DECOY DUCK
Filed Dec. 26, 1922
1,469,613
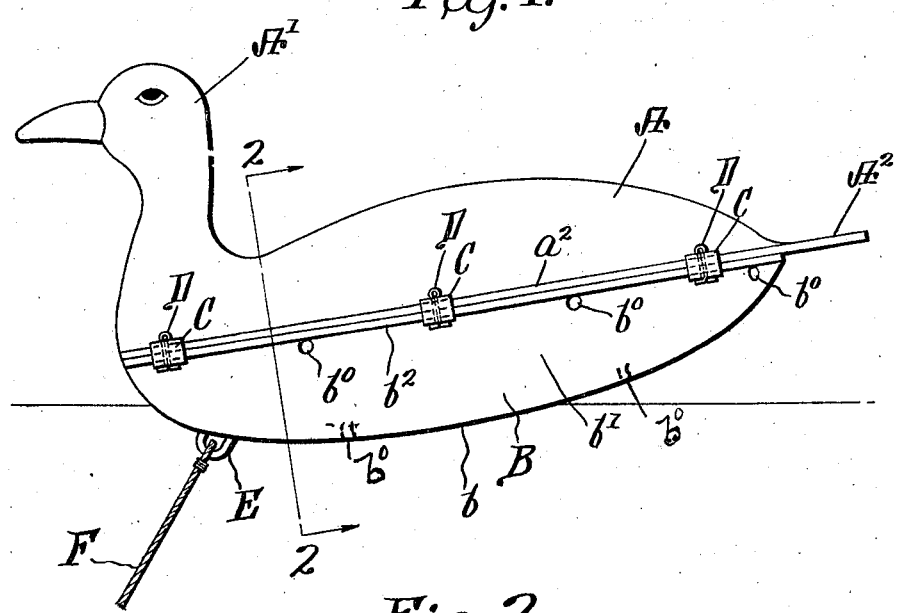
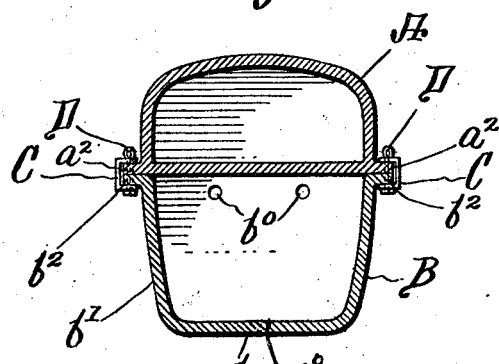

Patented Oct. 2, 1923.

1,469,613

UNITED STATES PATENT OFFICE.

JOSEPH KENTON BAILEY, OF NEW ORLEANS, LOUISIANA, ASSIGNOR TO BAYCO DECOY COMPANY, INC., OF NEW ORLEANS, LOUISIANA, A CORPORATION OF LOUISIANA.

DECOY DUCK.

Application filed December 26, 1922. Serial No. 609,064.

*To all whom it may concern:*

Be it known that I, JOSEPH KENTON BAILEY, a citizen of the United States, residing at New Orleans, in the parish of Orleans and State of Louisiana, have invented certain new and useful Improvements in Decoy Ducks, of which the following is a specification.

My invention relates to improvements in decoys for use in shooting ducks, or other wild fowl, in which the decoy is anchored in shallow water, or is placed on mud flats, or is attached to stakes or the like.

The invention relates to providing a light hollow decoy which will be easy to carry from place to place, and yet when placed on the water will quickly take on water ballast and remain in the upright position resembling a duck or other wild fowl floating on the water.

According to my invention I preferably provide a closed upper air chamber which gives the necessary buoyance to the decoy, and a lower chamber which is so perforated as to permit the influx of water and the egress of air, and which latter chamber, when the decoy is put in the water, is quickly filled with water, causing the decoy to assume the normal position of a duck or other fowl floating on the surface of the water.

My invention will be more clearly understood after reference to the accompanying drawings, in which like parts are indicated by similar reference symbols throughout the several views, and in which:—

Figure 1 is a side elevation of the decoy as it is first placed in the water and before the ballast chamber has been supplied with water; and Figure 2 shows a section along the line 2—2 of Fig. 1, and looking in the direction of the arrows.

A represents the upper closed air chamber which serves as a flotation chamber, to which may be attached, or preferably made integral therewith, the head $A'$ of the decoy and the tail $A^2$.

Attached to this flotation chamber A is the lower or ballast chamber B, which may be provided with suitable perforations, at suitable places, such as $b^0$, which perforations will permit the inflow of water and the egress of air from the ballast chamber, so that when the ballast chamber becomes filled or partly filled with water, the decoy will float at the natural level, and the upper portion A only will be seen.

This lower chamber B is preferably made flat along a portion of the bottom, as shown at $b$ in Fig. 2, so that the decoy may rest on its bottom when out of the water; and the sides $b'$ of the chamber B are preferably tapered upwards and terminate in flanges $b^2$ which abut against the flanges $a^2$ of the flotation chamber A. These flanges may be secured together in any convenient way, as by cementing, or by means of the clasps C and the bolts or pins D.

In order to anchor the decoy or to attach it to any fixed object, I provide suitable fastening means, such as the staple E shown in Fig. 1 and the cord F. Any suitable anchor may be provided, such as a piece of brick or stone, or even a metal anchor may be used if desired; or the cord F may be fastened to a rod or stake forced down in the soft bottom of the lake or pond near the blind.

The two chambers A and B may be made of any convenient material, such as papier mâché, or thin tinned steel, aluminum, or the like, and the two parts may be attached together in any convenient way. I preferably make the decoy of papier mâché, treated with suitable material, such as paraffin to exclude water.

The perforations $b^0$ in the ballast chamber may be located at any convenient points, one or more preferably in the bottom and others high enough to allow the escape of air as the water flows in.

In use the decoys are taken to the blind or other place where the hunter is located, put in the water, and there secured in place so as to float freely on the surface of the water. The water will quickly flow in through the perforations $b^0$, causing the ballast chamber to become filled or partly filled with water. The result will be that the flotation chamber will keep the upper portion of the decoy above the water, thus providing a suitable floating decoy. When the sportsman is through, he picks up his decoys, drains the water out of the ballast chamber, and carries the decoys away.

Obviously the upper portion of the decoy should be painted to represent a duck or other water fowl.

While I have shown the invention in the preferred form, it will be obvious that various modifications might be made in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:

1. A decoy for use in attracting water fowl comprising an upper closed hollow flotation chamber made in imitation of the upper portion of the water fowl, and a lower ballast chamber secured thereto and provided with perforations adapted to permit the influx of water and the escape of air.

2. A decoy for use in attracting water fowl, comprising an upper closed hollow flotation chamber made in imitation of the upper portion of the water fowl, and a lower ballast chamber provided with perforations adapted to permit the influx of water and the escape of air, said upper and lower chambers being provided with laterally disposed flanges secured together and forming a complete decoy.

JOSEPH KENTON BAILEY.